July 25, 1933.  J. M. McCLATCHIE  1,920,017

OVERLOAD RELEASE MECHANISM

Filed Jan. 17, 1931

INVENTOR
John M. McClatchie
BY Archibald Cox
ATTORNEY

Patented July 25, 1933

1,920,017

UNITED STATES PATENT OFFICE

JOHN M. McCLATCHIE, OF NEW YORK, N. Y., ASSIGNOR TO THE BORDEN COMPANY, OF NEW YORK, N. Y., A CORPORATION OF NEW JERSEY

OVERLOAD RELEASE MECHANISM

Application filed January 17, 1931. Serial No. 509,406.

This invention relates to mechanisms adapted to automatically disconnect driving and driven elements when an overload is placed upon one of them, and is more particularly concerned with mechanisms of this character wherein the driving and driven elements are mounted on the same shaft for rotation.

It has heretofore been proposed to provide a member for engaging driving and driven rotating elements to cause them to rotate together and to disconnect them in the event of an overload, but these have been complicated, expensive and noisy, the last owing to the connecting member striking against the element on which it is not mounted when not in engagement therewith.

The principal object of the invention resides in the provision of an improved mechanism of this general character which is simple and inexpensive to manufacture, efficient and reliable in operation, and wherein the member which engages driving and driven elements is held out of contact with the element with which it is not carried upon its being disconnected therefrom.

Figure 1:
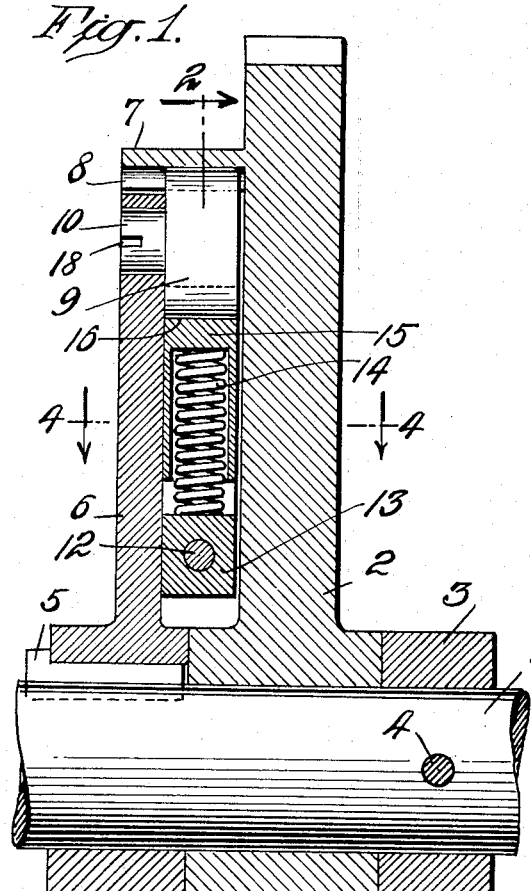
Figure 2:
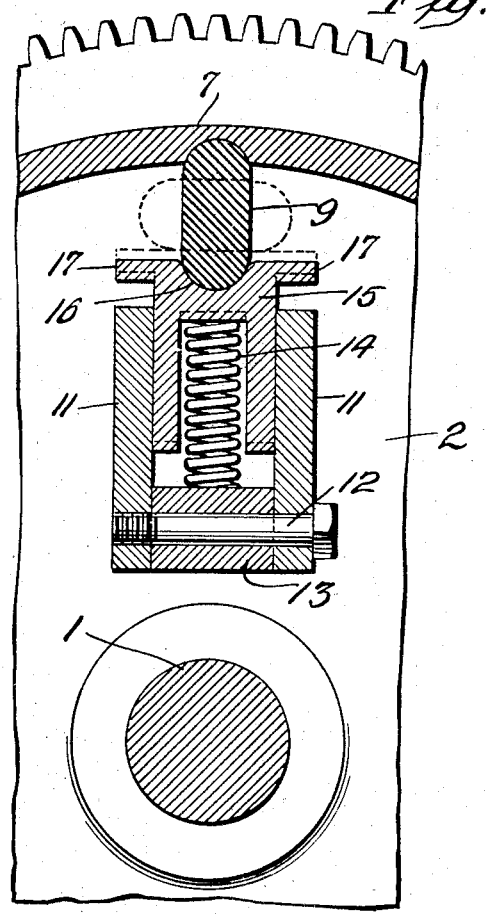
Figure 3:
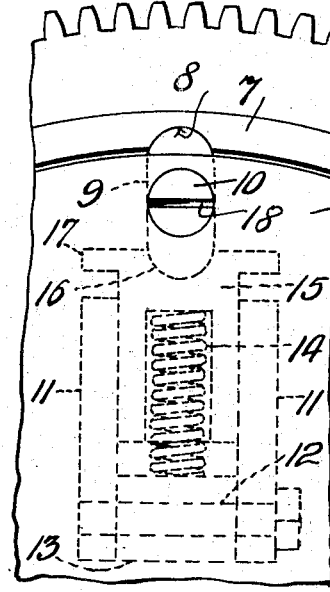
Figure 4:
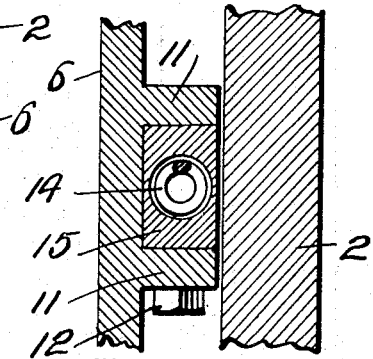

For a description of a preferred embodiment of my invention, reference will now be had to the accompanying drawing wherein: Fig. 1 is a view partly in section, showing driving and driven members and the means for operatively connecting them. Fig. 2 is a view taken on the line 2—2 of Fig. 1, looking in the direction of the arrows. Fig. 3 is a detail view of the upper portion of the device looking from the left in Fig. 1. Fig. 4 is a detail view taken on the line 4—4 of Fig. 1 looking in the direction of the arrows.

There is shown at 1, a shaft having a gear 2, journaled thereon. This gear may be driven by any suitable pinion (not shown). To prevent axial movement of the gear along the shaft a collar 3 is provided and secured to the shaft by a pin 4. Also mounted upon the same shaft and secured for rotation therewith by a key 5, is a driven element 6. Gear 2 is provided with a flange 7, in which is formed a depression 8 for purposes hereafter described. The flange 7, is circular and of somewhat larger diameter than the driven member 6, and overlies the latter. Adjacent the outside of the driven element an oblong member 9 is pivoted by means of a pin 10, formed thereon and journaled in the driven element. This oblong member is rounded at either end and is adapted to engage the depression in the flange on the driving element when it is in the position shown in Fig. 1. For maintaining this member in such position the driven element carries extensions 11, having secured between them by a bolt 12, a piece 13, which supports a spring 14. Between the end of the spring and the oblong member there is interposed a member 15, which surrounds the spring and slides between extensions 11. This member is provided with a depression 16, similar to the one on the driving member, in which the other end of the oblong member seats.

In operating the device one simply sets the driving member at the proper position as shown in Fig. 2 by inserting the end of a screw driver in the slot 18 in the pin 10 and turning the oblong member until it snaps into the depressions. On rotation of the driving member the device continues to cause the driven member to rotate unless an overload should be placed on the driven member, when the driving member will overrun the driven member, causing the oblong member 9, to assume the position shown in dotted lines in Fig. 2, at which time its side rests against the shoulders 17, on member 15. It is there held against further turning, out of contact with the driving element, by the action of the spring. The tension of the spring is such that a predetermined overload will cause it to yield enough to permit the oblong member to be freed from the depressions in which it normally seats.

It is to be understood, of course, that the particular shape of the oblong member is not important except in so far as it must have one dimension which is somewhat longer than the other. For example, it might be oval. Furthermore, although I have described my invention in detail it is not to be limited save by the scope of the appended claims.

I claim:

1. In a device of the character described having rotary driving and driven elements, means operatively to connect said elements, and automatically to disconnect them under an overload, comprising an oblong member pivotally carried with one of said elements, a depression formed in the other element, a spring carried with the first-named element means operatively interposed between the spring and the member and having a depression for engagement with one end of the oblong member when its other end engages the first-named depression and portions for abutting against a side of the oblong member when it is turned so as not to engage the depressions, and means carried with the member whereby it may be turned to a desired position.

2. In a device of the character described a driving member having an annular flange provided with a recess, a driven member located within said flange, a spring-pressed recessed plunger fixed to one of said members and situated between both members, an oblong, pivotally-mounted clutch member fixed to one of said members and adapted to have one of its ends seated in the recess in the flange and its other end seated in the recess in the plunger to establish a driving connection between the driving member and the driven member.

3. In a device of the character described, a shaft upon which driven and driving members are located, one of said members having a flange overlying the periphery of the other member, a recess provided in said flange, a spring-pressed oblong clutch member provided on the member within the flange, said clutch member being located between the driven and driving members and held in engagement with the recess in the flange, said clutch member having an adjusting means projecting through the member upon which it is mounted, said adjusting means being accessible upon the opposite side of the member on which it is mounted for rotative adjustment of the clutch member.

JOHN M. McCLATCHIE.